US007041768B2

(12) United States Patent
Gürtler et al.

(10) Patent No.: US 7,041,768 B2
(45) Date of Patent: May 9, 2006

(54) POLYURETHANE COATING SYSTEMS

(75) Inventors: Christoph Gürtler, Köln (DE); Jan Mazanek, Köln (DE); Joachim Petzoldt, Monheim (DE); Heinz Schmidt, Erftstadt (DE); Stephan Nowak, Köln (DE)

(73) Assignee: Bayer Materialscience AG, Leverkusen (DE)

( * ) Notice: Subject to any disclaimer, the term of this patent is extended or adjusted under 35 U.S.C. 154(b) by 0 days.

(21) Appl. No.: 10/783,885

(22) Filed: Feb. 20, 2004

(65) Prior Publication Data

US 2004/0229047 A1 Nov. 18, 2004

(30) Foreign Application Priority Data

Feb. 26, 2003 (DE) .................. 103 08 105

(51) Int. Cl.
*C08G 18/10* (2006.01)
(52) U.S. Cl. .................. 528/45; 528/56; 524/839
(58) Field of Classification Search ............ 528/45, 528/56; 524/839
See application file for complete search history.

(56) References Cited

U.S. PATENT DOCUMENTS

| | | | |
|---|---|---|---|
| 3,674,716 A | 7/1972 | Dijkhuizen et al. | 260/2.5 AB |
| 4,108,814 A | 8/1978 | Reiff | 260/29.2 TN |
| 4,482,721 A | 11/1984 | Wegner et al. | 548/262 |
| 4,976,837 A | 12/1990 | Hughes et al. | 204/181.7 |
| 5,126,393 A | 6/1992 | Blum et al. | 524/538 |
| 5,246,557 A | 9/1993 | Hughes et al. | 204/181.4 |
| 5,294,665 A | 3/1994 | Pedain et al. | 524/591 |
| 5,352,755 A | 10/1994 | Hughes et al. | 528/45 |
| 5,455,297 A | 10/1995 | Pedain et al. | 524/591 |
| 5,621,063 A | 4/1997 | Wolf et al. | 528/45 |
| 5,718,817 A | 2/1998 | Bossert et al. | 204/501 |
| 5,756,634 A | 5/1998 | Braunstein et al. | 528/45 |
| 5,859,165 A | 1/1999 | Bossert et al. | 528/58 |
| 5,986,033 A | 11/1999 | Hughes et al. | 528/45 |
| 6,063,860 A | 5/2000 | Rimmer et al. | 524/590 |
| 6,353,057 B1 | 3/2002 | He et al. | 525/124 |
| 6,368,669 B1 | 4/2002 | Hughes et al. | 427/385.5 |
| 2003/0055158 A1 | 3/2003 | Konig et al. | 524/589 |

FOREIGN PATENT DOCUMENTS

| | | |
|---|---|---|
| CA | 2169226 | 8/1996 |
| CA | 2253119 | 5/1999 |
| EP | 0 157 291 | 7/1989 |
| JP | 2000198963 | * 7/2000 |

OTHER PUBLICATIONS

Progress in Organic Coatings, 41, (month available) 2001, pp. 1-83, Douglas A. Wicks, Zeno W. Wicks, Jr., "Blocked isocyanates III Part B: Uses and applications of blocked isocyanates".
Polyurethanes Chemistry and Technology, High Polymers, vol. XVI, Saunders/Frisch, (month unavailable) 1962, pp. 169, "IV. Kinetics and Catalysis of Reactions".
Progress in Organic Coatings, 3, (month unavailable 1975, pp. 73-79, Zeno W. Wicks, Jr., "Blocked Isocyanates".
Progress in Organic Coatings, 9 (month unavailable) 1981, pp. 3-28, Zeno W. Wicks, Jr., "New Developments in the Field of Blocked Isocyanates".
Progress in Organic Coatings, 36, (month unavailable) 1999, pp. 148-172, Douglas A. Wicks, Zeno W. Wicks, Jr., "Blocked isocyanates III: Part A. Mechanisms and chemistry".
Houben-Weyl, Methoden Der Organischen Chemie, vol. XIV/2, (month unavailable) 1963, pp. 1-47, Dr. Erwin Müller, "$A_2$. Methoden zur Herstellung makromolekularer Stoffe durch Polykondensation und Polyaddition sowie durch Polymerisation von cyclischen Monomeren mit Heteroatomen als Ringglieder ".

* cited by examiner

*Primary Examiner*—Rachel Gorr
(74) *Attorney, Agent, or Firm*—Joseph C. Gil; Thomas W. Roy

(57) ABSTRACT

The present invention relates to novel one-component polyurethane systems including one or more organic and/or inorganic compounds of vanadium in which the vanadium has an oxidation state of at least +4, to their preparation and use for preparing paints, inks and adhesives.

18 Claims, No Drawings

POLYURETHANE COATING SYSTEMS

CROSS REFERENCE TO RELATED PATENT APPLICATION

The present patent application claims the right of priority under 35 U.S.C. §119 (a)–(d) of German Patent Application No. 103 08 105.4, filed Feb. 26, 2003.

FIELD OF THE INVENTION

The present invention relates to novel one-component polyurethane systems, to their preparation and use for preparing paints, inks and adhesives.

BACKGROUND OF THE INVENTION

One-component (1K) baking systems based on polyurethane are heat-curable materials, stable on storage at room temperature, for preparing paints, inks and adhesives. They consist in general of blocked polyisocyanates which in the course of thermal curing are consumed by reaction with hydroxyl-containing polyesters, polyacrylates, other hydroxy-functional polymers and/or mixtures of different polymers. Another possibility to obtain raw materials for baking enamels which are stable on storage at room temperature is the partial blocking of the isocyanate groups of polymers containing both blocked isocyanate groups and hydroxyl groups.

The principal compounds used to block polyisocyanates and 1K baking systems are ε-caprolactam, methyl ethyl ketoxime (butanone oxime), secondary amines and also triazole and pyrazole derivatives, as described for example in EP-A 0 576 952, EP-A 0 566 953, EP-A 0 159 117, U.S. Pat. No. 4,482,721, WO 97/12924 or EP-A 0 744 423. Malonate blocking is also possible. With this kind of blocking, however, the blocking agent is not cleaved back; instead, a transesterification reaction takes place on the diethyl malonate radical.

Depending on the blocking agent used, temperatures of 100–160° C. are employed in producing coatings from the 1K PU baking systems. The selection of the appropriate blocking agent for the particular system, however, is made not only according to the baking temperature. Other factors, such as yellowing tendency, odour and storage stability of the systems, for example, also play an important part. Since especially in recent times a concern has been to minimize the baking temperature of coating systems, it is necessary in each case to find a compromise in terms of the composition of the coating materials and the properties of the coating. From this it is evident that there is a need for new baking systems which have optimum performance properties even at relatively low baking temperatures.

In the past already a large number of experiments have been undertaken aimed at lowering the baking temperature of 1K systems through the use of catalysts. Thus in EP-A 0 761 705, for example, organic bismuth compounds are claimed for the catalysis of partly or fully blocked polyisocyanates. U.S. Pat. No. 5,859,165 describes reaction products of manganese, cobalt, nickel, copper, zinc, germanium, antimony or bismuth and/or their oxides as catalysts for blocked poly(thio)isocyanates. EP-A 0 726 284 describes in general terms metal salts and/or metal complexes for catalysing the reaction of blocked polyisocyanates with polyols, although the examples disclose only dibutyltin dilaurate and dibutyltin acetate specifically.

In order to reduce the use of organic solvents and hence to reduce the emission of these solvents into the environment, and in order to improve working conditions on the coating line through reduced solvent emission, recent years have seen the development of 1K coating systems comprising water as a predominant solvent component. An overview of this technology is given by D. A. Wicks and Z. W. Wicks in *Progress in Organic Coatings* 2001, 41(1–3), 1–83. This technology is spreading. The presence of the aqueous solvent and/or dispersion medium imposes different requirements regarding the use of catalysts than is the case with what are termed solvent-borne systems. Thus in the latter systems, when using catalysts, there is no need to ensure that the catalyst used is stable to water or to hydrolysis. Consequently, the common catalysts employed in solvent-borne 1K systems cannot generally be used in what are termed aqueous systems. Known representatives of such catalysts, which possess a high activity (i.e. a marked reduction in the baking temperatures) include, for example, bismuth 2-ethylhexanoate and organic tin(IV) compounds such as dibutyltin dilaurate (DBTL). Besides these a range of further compounds have been disclosed, described in the above-cited article by Wicks et al. It is also known that bismuth carboxylates are hydrolysed in water.

To date only a few catalysts have been disclosed for accelerating the curing of aqueous one-component systems. WO 95/04093 outlines organotin-based systems. These are catalysts which are used in particular in systems for electrocoating, where curing normally takes place at high temperatures of approximately 170° C. or more. The blocking agents and polyisocyanates used in each case are not specified in the examples. However, owing to ecological considerations, the use of organotin catalysts is not desirable. The activity of these and other catalysts in comparison to other catalyst systems is also described in the following application.

The Description of WO 00/47642, page 4, cites very specific examples of catalysts for 1K aqueous applications. Thus organotin compounds and lead compounds are described whose use in coatings, however, is not desirable, from standpoints of ecology.

WO 00/47642 also contains a reference to a catalyst for aqueous one-component systems which is based on the reaction of bismuth oxide with a carboxylic acid having a carbon chain length of from $C_{11}$ to $C_{36}$. Although hydrolysis of the catalyst takes place with this system as well, the catalyst is said to reform from the constituents at the relatively high baking temperatures of more than 165° C. up to 180° C. and to possess a high catalytic activity. The use of this catalyst system, however, is tied to very specific resins and/or alcohol components.

The activity of the catalyst system described is described only for specific resins—in this case, cationically hydrophilicized resins, i.e. resins obtained by reacting, for example, an expoxy resin containing bisphenyl A with an amine. Depending on the amine used (primary, secondary, tertiary) and in the presence of an excess of the epoxy resin and in the presence of water and neutralizing acid it is also possible for quaternary ammonium groups to form. Hence the resin is in principle amine-containing, which is unsuitable for the development of an automotive surfacer that is intended to have low yellowing and good long-term stability.

As an alternative to cationic hydrophilicization it would be possible to prepare an aqueous 1K PU system by adding surface-active substances or emulsifiers. The catalyst system presented therein is not described for such a coating system of this kind.

Also possible is hydrophilicization with, for example, anionic hydrophilicizers (e.g. by carboxylic acids), or nonionic hydrophilicizers such as, for example, by polyethers (incorporated into the resin and not as an individual constituent, as in the case of the emulsifiers) for the preparation of an aqueous 1K system. The catalyst system presented therein, however, has likewise not been described for such a coating system.

On the basis of the different possibilities of hydrophilicizing 1K systems (cationically, by emulsifiers, by anionic or nonionic hydrophilicization) the use and activity of the catalyst system described in WO 00/47642 in systems other than cationically hydrophilicized systems is not obvious. For example, cationic hydrophilicizing can act through ammonium salts as a ligand for stabilization. This stabilizing effect is absent in the 1K systems, which are not cationically hydrophilicized.

Moreover, the aforementioned publication describes only alcohol-blocked isocyanates. A typical blocking agent for blocking the isocyanate exclusively described therein, poly-meric) MDI (methylene-phenyl diisocyanate), is butoxy-ethoxyethanol (butyl carbitol). In addition, 2-ethoxyethanol and 2-methoxyethanol are also cited. The elimination of this blocking agent (in actual fact a urethane cleavage) re,quires high temperatures: baking is carried out at temperatures of 165–180° C. over a period of 20 minutes.

For the intended use as coating composition for passenger cars it is desirable to find catalysts which allow a one-component system to be cured at temperatures of not more than 140° C., and preferably at an even lower temperature. Accordingly, no catalyst is known at present whose use in aqueous systems based on a broad spectrum of blocking agents, blocked (poly)isocyanates and hydrophilicizing methods would allow the baking temperatures to be lowered to the desired level.

The object was therefore to find a catalyst suitable for general use which is effective at low baking temperatures and with a multiplicity of blocking agents and resins and hydrophilicizing agents. Account ought at the same time to be taken of ecological aspects.

SUMMARY OF THE INVENTION

The present invention is directed to polyurethane-based one-component baking systems including one or more organic and/or inorganic compounds of vanadium in which the vanadium has an oxidation state of at least +4.

Embodiments of the invention are directed to the above-described systems further including
(a) blocked polyisocyanates,
(b) polymers having polyisocyanate-reactive groups,
(c) one or more organic and/or inorganic compounds of vanadium in which the vanadium has an oxidation state of at least +4,
(d) water and/or organic solvents or solvent mixtures and
(e) if desired, further additives and auxiliaries,
where the amounts of (a)+(b) being from 20 to 89.9 parts by weight, (c) from 0.01 to 5 parts by weight, (d) from 10 to 70 parts by weight and (e) from 0 to 10 parts by weight and the sum of the parts by weight of components (a) to (e) being 100.

The present invention is also directed to processes for preparing the above-described systems. The processes can include introducing component (c) into components (a) and/or (b) prior to the dispersing or dissolution thereof in component (d), introducing component (c) into component (d) prior to the dispersing or dissolution of component (a) and/or (b) in the same and/or adding component (c) to one or more of components (a), (b), (d) and/or (e) before adding a dispersing quantity of water.

The present invention is further directed to methods for preparing paints, inks and adhesives including adding one or more additives selected from pigments, fillers, levelling agents, defoamers, and catalysts other than (c) to the above-described systems. The invention is additionally directed to substrates coated with coatings obtainable from the inventive systems.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about."

The object of the invention has been achieved with the provision of the catalysts of the invention based on certain vanadium compounds.

The use of vanadium compounds to catalyse blocked polyisocyanates and one-component baking systems was hitherto unknown. Particularly suitable for catalyst use are the compounds of vanadium in their higher oxidation states. Compounds of vanadium, for example, in oxidation state +5 (e.g. vanadium oxide triethylate as vanadate for the preparation of polyurethanes) (see also DE-A 1 921 952) or else in Saunders/Frisch: High Polymers, Vol. XVI (1962), p. 169) have been used to catalyse the reactions of non-blocked isocyanates with alcohols. At the same time, however, DE-A 1 921 952 excludes the use of vanadium compounds in systems containing water (because of the tendency of vanadium oxide alkoxides to hydrolyse) and only describes vanadium oxide trialkoxides. Accelerating the reaction of blocked isocyanates with polyols, for example, in the presence of vanadium compounds was therefore not suggested by the prior art.

It has been found that through the use of the catalysts of the invention in 1K systems based on blocked isocyanates it is possible, depending on the blocking agent used, to lower the baking temperature by about 20° C. Accordingly it is possible to attain low baking temperatures of approximately 130° C. The catalysts of the invention, however, are sufficiently active even at a low temperature, for example 120° C., as is shown in the examples below.

The present invention provides polyurethane-based one-component baking systems characterized in that they comprise one or more organic and/or inorganic compounds of vanadium in which the vanadium has an oxidation state of at least +4.

These one-component systems are preferably characterized in that they comprise
(a) blocked polyisocyanates,
(b) polymers having polyisocyanate-reactive groups,
(c) one or more organic and/or inorganic compounds of vanadium in which the vanadium has an oxidation state of at least +4,
(d) water and/or organic solvents or solvent mixtures and
(e) if desired, further additives and auxiliaries, the amounts of (a)+(b) being from 20 to 89.9 parts by weight, (c) from 0.01 to 5 parts by weight, (d) from 10 to 70 parts by weight and (e) from 0 to 10 parts by weight and the sum of the parts by weight of components (a) to (e) being 100.

The invention also provides processes for preparing the one-component baking systems of general composition (a) to (e).

The invention further provides for the use of the one-component baking systems of the invention for preparing paints, inks and other baking systems such as adhesives or elastomers and provides the coatings produced therefrom.

The 1K baking systems of the invention comprise, as a crosslinker component, blocked polyisocyanates (a) such as are obtainable in conventional manner by reacting any desired organic polyisocyanates A) with any desired blocking agents B) and, if desired, further synthesis components C). Suitable polyisocyanates A) for preparing the blocked polyisocyanates (a) are any desired organic polyisocyanates which are known from the conventional polyurethane systems for crosslinking compounds containing active hydrogen, i.e. aliphatic polyisocyanates, including the cycloaliphatic polyisocyanates, aromatic polyisocyanates and heterocyclic polyisocyanates having at least two isocyanate groups, and mixtures thereof. Typical examples of suitable polyisocyanates A) are aliphatic isocyanates such as di- or triisocyanates, e.g. butane diisocyanate (BDI), pentane diisocyanate, hexane diisocyanate (HDI), 4-isocyanatomethyl-1,8-octane diisocyanate (triisocyanatononane, TN) or cyclic systems, such as 4,4'-methylenebis(cyclohexyl isocyanate) (Desmodur® W, Bayer A G, Leverkusen), 3,5,5-trimethyl-1-isocyanato-3-isocyanatomethylcyclohexane (IPDI) and ω,ω'-diisocyanato-1,3-dimethylcyclohexane ($H_6$XDI). Examples of aromatic polyisocyanates are 1,5-naphthalene diisocyanate, diisocyanatodiphenylmethane (MDI) or crude MDI, diisocyanatomethylbenzene (TDI), particularly the 2,4 and 2,6 isomers, and technical-grade mixtures of the two isomers, and also 1,3-bis(isocyanatomethyl)benzene (XDI). Likewise highly suitable as well are polyisocyanates obtainable by reacting the di- or triisocyanates with themselves via isocyanate groups, such as uretdiones or carbodiimide compounds or such as isocyanurates or iminooxadiazinediones, which are formed by reaction of three isocyanate groups.

Other suitable polyisocyanates include oligomeric polyisocyanates having biuret, allophanate and acylurea structural elements, and also any desired mixtures of the stated polyisocyanates. Mixtures of polyisocyanates having the stated structural units and/or mixtures of the modified polyisocyanates with the monomeric isocyanates can also be used. The polyisocyanates thus modified can also be proportionally prepolymerized with other isocyanate-reactive groups. Proportionally modified polyisocyanates are much preferred. Likewise highly suitable are polyisocyanate prepolymers containing on average more than one isocyanate group per molecule. They are obtained by preliminary reaction of a molar excess of, for example, one of the abovementioned di, tri- or polyisocyanates and modified polyisocyanates with an organic material having at least two active hydrogen atoms per molecule, in the form of hydroxy groups, for example. They, similarly, can be proportionally prepolymerized as described in the next section.

Additionally suitable are low molecular mass polyisocyanates containing urethane groups, as may be obtained by reacting diisocyanates used in excess, preferably IPDI or TDI, with simple polyhydric alcohols of the molecular weight range 62–300, in particular with trimethylolpropane or glycerol.

Suitable polyisocyanates A) further include the known prepolymers containing terminal isocyanate groups, as are obtainable in particular by reacting the abovementioned simple polyisocyanates, especially diisocyanates, with substoichiometric amounts of organic compounds having at least two isocyanate-reactive functional groups. In these known prepolymers the ratio of isocyanate groups to NCO reactive hydrogen atoms is from 1.05:1 to 10:1, preferably from 1.1:1 to 3:1, the hydrogen atoms originating preferably from hydroxyl groups. The nature and proportions of the starting materials used in preparing NCO prepolymers are otherwise preferably chosen such that the NCO prepolymers preferably have an average NCO functionality of from 2 to 3 and a number-average molar mass of 500–10000, preferably 800–4000.

Preferred polyisocyanates A) are those which include a uretdione, isocyanurate, iminooxadiazinedione, acylurea, urethane, biuret or allophanate structure, preference being given to those polyisocyanates based on 1,6-hexamethylene diisocyanate, 3,5,5-trimethyl-1-isocyanato-3-isocyanatomethylcyclohexane (IPDI), ω,ω'-diisocyanato-1,3-dimethylcyclohexane ($H_6$XDI) and 4,4'-methylenebis(cyclohexyl isocyanate) (Desmodur® W, Bayer A G, Leverkusen).

Additionally suitable as polyisocyanates A) in the sense of the invention are those polyurethane-, polyester- and/or polyacrylate-based polymers, containing free isocyanate groups, and also, where appropriate, mixtures thereof, in which only some of the free isocyanate groups are reacted with blocking agents while the remainder are reacted with an excess of hydroxyl-containing polyesters, polyurethanes and/or polyacrylates and also, where appropriate, mixtures thereof to form a polymer which contains free hydroxyl groups and which on heating to appropriate baking temperatures, without the addition of further components, crosslinks isocyanate groups reactive groups (self-crosslinking one-component baking systems).

All polyisocyanates mentioned can also be used as any desired mixtures with one another or else with other crosslinkers such as with melamine resins to prepare paints, inks and other formulations.

Suitable blocking agents B) include N—H or O—H functional compounds, which are consumed by reaction with isocyanates and which at appropriate temperature allow a crosslinking reaction with a further N—H or O—H functional compound. Examples of suitable blocking agents are dimethylpyrazole, diisopropylamine, tert-butylbenzylamine, butanone oxime, ε-caprolactam, ethoxyethanol, isopropoxyethanol and other alcohols such as carbitols. It is also possible to use secondary amines such as dibutylamine, for example, or other oximes, such as cyclohexanone oxime or else acetone oxime, for example. An overview of blocking agents suitable in principle can be found, for example, in Wicks et al. in *Progress in Organic Coatings* 1975, 3, pp. 73–79, 1981, 9, pp. 3–28 and 1999, 36, pp. 148–172. Preference is given to using 3,5-dimethylprazole, diusopropylamine, tert-butylbenzylamine, butanone oxime and ethoxyethanol.

The ratio of isocyanate groups to the blocking agent is generally 1:1 but can also adopt a value of from 0.5:1 to 2:1. Preference is given to a ratio of from 0.9:1 to 1.1:1, with particular preference from 0.95:1 to 1:1.

The blocked polyisocyanates (a) can be prepared by conventional methods. For example, one or more polyisocyanates can be introduced as an initial charge and the blocking agent can be metered in with stirring (over the course of about 10 minutes, for example). Stirring is continued until free isocyanate is no longer detectable. It is also possible to block one or more polyisocyanates with a mixture of two or more blocking agents (including where appropriate non-inventive blocking agents). The blocked polyisocyanates can of course also be prepared in solvents.

These solvents either can be distilled off again in the subsequent preparation steps or else they remain in the product.

A further possibility for preparing the blocked polyisocyanates (a) used in accordance with the invention involves hydrophilicizing them ionically, nonionically or by both methods, in accordance with conventional processes, and adding water and then dissolving or dispersing them therein. In preparing the polyisocyanates it is also possible to use catalysts, cosolvents and other auxiliaries and additives. The preparation of the aqueous one-component baking systems can also take place such that non-blocked or only part-blocked polyisocyanates are mixed with polyesters, polyacrylates, polyacrylate-modified and polyurethane-modified polyesters containing hydrophilic groups and then are converted into a dispersion.

Suitable further synthesis components C include ionic or potentially ionic compounds C1) and/or, as nonionic hydrophilicizing agents, compounds C2. Examples of ionic or potentially ionic compounds C1 are mono- and dihydroxycarboxylic acids, mono- and diaminocarboxylic acids, mono- and dihydroxysulphonic acids, mono- and diaminosulphonic acids and mono- and dihydroxyphosphonic acids and/or mono- and diaminophosphonic acids and their salts such as dimethylolpropionic acid, hydroxypivalic acid, N-(2-aminoethyl)-β-alanine, 2-(2-aminoethylamino)ethanesulphonic acid, ethylenediamine-propyl- or butylsulphonic acid, 1,2- or 1,3-propylenediamine-β-ethylsulphonic acid, lysine, 3,5-diaminobenzoic acid, the hydrophilicizing agent from Example 1 of EP-A 0 916 647 and its alkali metal and/or ammonium salts; the adduct of sodium bisulphite with but-2-ene-1,4-diol, polyethersulphonate, the propoxylated adduct of 2-butenediol and NaHSO$_3$ (e.g. in DE-A 2 446 440, page 5–9, formula I–III) and also units which can be converted into cationic groups, such as N-methyldiethanolamine, as hydrophilic synthesis components.

Preferred ionic, or potentially ionic compounds C1 are those which possess carboxy or carboxylate and/or sulphonate groups and/or ammonium groups. Particularly preferred ionic compounds are those containing carboxyl and/or sulphonate groups as ionic or potentially ionic groups, such as the salts of N-(2-aminoethyl)-β-alanine, 2-(2-amino-ethylamino)ethanesulphonic acid, of the hydrophilicizing agent from Example 1 of EP-A 0 916 647 and of dimethylolpropionic acid.

As synthesis components C3 it is also possible to use those described below as compounds (b).

The hydroxyl components included among the described components C1, C2 and C3 can contain double bonds, which may originate, for example, from long-chain aliphatic carboxylic acids or fatty alcohols. Functionalization with olefinic double bonds is possible, for example, through the incorporation of allylic groups or of acrylic acid or methacrylic acid and also their respective esters. This raises the possibility of utilizing these substances for subsequent oxidative crosslinking using siccatives (Co$^{+3}$) in the presence of atmospheric oxygen compounds or, through UV irradiation, for a further crosslinking.

Through the interaction and/or reaction of components (a) to (e), after dispersion in and/or with water, so-called PU dispersions are obtained which in essence are aqueous 1K PU coating systems. These PU dispersions may further comprise nonionically hydrophilicizing compounds C2 such as, for example, polyoxyalkylene ethers having at least one hydroxy or amino group. These polyethers include a fraction of from 30% by weight to 100% by weight of units derived from ethylene oxide. Those suitable include polyethers of linear construction with a functionality of between 1 and 3, but also compounds of the general formula (VI),

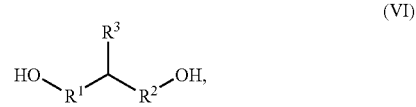

in which
R$^1$ and R$^2$ independently of one another are each a divalent aliphatic, cycloaliphatic or aromatic radical having 1 to 18 carbon atoms, which may be interrupted by oxygen and/or nitrogen atoms, and
R$^3$ is a non-hydroxy-terminated polyester or, preferably, polyether. With particular preference R$^3$ is an alkoxy-terminated polyethylene oxide radical.

Nonionically hydrophilicizing compounds used as further synthesis component C2 also include, for example, polyalkylene oxide polyether alcohols which are monovalent and contain on average per molecule from 5 to 70, preferably from 7 to 55 ethylene oxide units, these alcohols being as obtainable conventionally by alkoxylating suitable starter molecules (e.g. in Ullmanns Encyclopädie der technischen Chemie, 4th edition, volume 19, Verlag Chemie, Weinheim pp. 31–38). Examples of suitable starter molecules include saturated monoalcohols such as methanol, ethanol, n-propanol, isopropanol, n-butanol, isobutanol, sec-butanol, the isomers pentanols, hexanols, octanols and nonanols, n-decanol, n-dodecanol, n-tetradecanol, n-hexadecanol, n-octadecanol, cyclohexanol, the isomeric methylcyclohexanols or hydroxymethylcyclohexane, 3-ethyl-3-hydroxymethyl-oxetane, or tetrahydrofurfuryl alcohol; diethylene glycol monoalkyl ethers such as diethylene glycol monobutyl ether, for example; unsaturated alcohols such as allyl alcohol, 1,1-dimethylallyl alcohol or oleyl alcohol, aromatic alcohols such as phenol, the isomeric cresols or methoxyphenols, araliphatic alcohols such as benzyl alcohol, anisyl alcohol or cinnamyl alcohol; secondary monoamines such as dimethylamine, diethylamine, dipropylamine, diisopropylamine, dibutylamine, bis-(2-ethylhexyl)amine, n-methyl- and n-ethylcyclohexylamine or dicyclohexylamine, and heterocyclic secondary amines such as morpholine, pyrrolidine, piperidine or 1H-pyrazole.

Preferred starter molecules are saturated monoalcohols and also diethylene glycol monoalkyl ethers. It is particularly preferred to use diethylene glycol monobutyl or methyl ether as starter molecule.

Alkylene oxides suitable for the alkoxylation reaction are, in particular, ethylene oxide and propylene oxide, which can be used in either order or else in a mixture in the alkoxylation reaction.

The polyalkylene oxide polyether alcohols are either pure polyethylene oxide polyethers or mixed polyalkylene oxide polyethers at least 30 mol % preferably at least 40 mol % of whose alkylene oxide units consist of ethylene oxide units. Preferred nonionic compounds are monofunctional mixed polyalkylene oxide polyethers containing at least 40 mol % ethylene oxide units and not more than 60 mol % propylene oxide units.

The PU dispersions of the invention can also be hydrophilicized using combinations of ionic and nonionic hydrophilicizing agents. Alternatively it is also possible to use cationic hydrophilicizing agents. If the former is the case, then preference is given to using combinations of anionic and nonionic hydrophilicizing agents.

The polyisocyanates are, as described above, either self-crosslinking polymers or else crosslinkers for any desired compounds containing polyisocyanate-reactive groups (b). Suitable compounds of the stated type (b), which can also be used as mixtures, include the following:

Polyhydroxy polyesters, polyhydroxy polyethers or hydroxyl-containing addition polymers, examples being the polyhydroxy polyacrylates known per se. The compounds generally have a hydroxyl number of from 20 to 200, preferably from 50 to 130, based on products in 100% form.

The polyhydroxyl polyacrylates are conventional copolymers of styrene with simple esters of acrylic acid and/or methacrylic acid, with the additional use, in order to introduce the hydroxyl groups, of hydroxyalkyl esters, such as the 2-hydroxyethyl, 2-hydroxypropyl, 2-, 3- or 4-hydroxybutyl esters of these acids, for example.

Suitable polyether polyols are the ethoxylation products and/or propoxylation products, known per se from polyurethane chemistry, of suitable di- to tetravalent starter molecules such as water, ethylene glycol, propanediol, trimethylolpropane, glycerol and/or pentaethyritol, for example.

Examples of suitable polyester polyols are in particular the reaction products, known per se in polyurethane chemistry, of polyhydric alcohols, for example alkanepolyols, of the type just exemplified with excess amounts of polycarboxylic acids and/or polycarboxylic anhydrides, especially dicarboxylic acids and/or dicarboxylic anhydrides. Examples of suitable polycarboxylic acids and polycarboxylic anhydrides are adipic acid, phthalic acid, isophthalic acid, phthalic anhydride, tetrahydrophthalic anhydride, hexahydrophthalic anhydride, maleic acid, maleic anhydride, their Diels-Alder adducts with cyclopentadiene, fumaric acid or dimeric and/or trimeric fatty acids. In the preparation of the polyester polyols it is of course possible to use any desired mixtures of the exemplified polyhydric alcohols or any desired mixtures of the exemplified acids and acid anhydrides.

The polyester polyols are prepared by known methods, as described for example in Houben-Weyl, Methoden der organischen Chemie, volume XIV/2, G. Thieme-Verlag, 1963, pages 1 to 47. Hydrophilic modification of these polyhydroxyl compounds, where necessary, takes place in accordance with conventional methods, as disclosed for example in EP-A 0 157 291 or EP-A 0 427 028.

It is also possible to use mixtures of these polyols or else other combinations, polyacrylate-modified and/or polyurethane-modified polyesters.

Suitable polyol components (b) in the one-component systems of the invention also include dihydric to hexahydric alcohols and/or mixtures thereof which contain no ester groups. Typical examples are ethane-1,2-diol, propane-1,2- and -1,3-diol, butane-1,4, -1,2- or -2,3-diol, hexane-1,6-diol, 1,4-dihydroxycyclohexane, glycerol, trimethylolethane, trimethylolpropane, pentaerythritol and sorbitol. It is of course also possible to use alcohols having ionic groups or groups which can be converted into ionic groups. Preference is given for example to 1,4- or 1,3-butanediol, 1,6-hexanediol and/or trimethylolpropane.

In the preparation of the one-component baking systems of the invention it is also possible as component (b) to use compounds containing amino groups such as ethanolamine and its derivatives. Diamines, too, such as hexamethylenediamine, ethylenediamine, isophoronediamine or hydrazine and/or its derivatives can be used.

The ratio of the groups which are reactive towards the blocked isocyanates to the blocked isocyanates can be varied within a wide range and will generally be from 0.5:1 to 2:1. It is preferred to operate in a ratio of 1:1 or 1.5:1.

The one-component baking-enamels of the invention comprise organic and/or inorganic vanadium compounds as catalysts (c) for accelerating the crosslinking reaction.

Suitable vanadium compounds include all known compounds of vanadium in which it has an oxidation state of greater than or equal to +4. They can be soluble or partially soluble or else insoluble in the one-component baking system for catalysis. They can be organic or else inorganic in nature; it is also possible to use mixtures of different vanadium compounds, and also mixtures of the vanadium compounds with other catalysts such as amines and/or tin compounds or bismuth compounds.

Examples of preferred vanadium compounds are ammonium, lithium, sodium and potassium vanadate, lithium, sodium and potassium orthovanadate, magnesium vanadate, calcium vanadate, vanadyl(IV) acetylacetonate (VO($C_5H_7O_5$)$_2$), vanadyl bistetramethylheptadionate VO(TMHD)$_2$, and vanadic acid.

Preference is given in the sense of the invention to compounds of vanadium in the oxidation state +4 and +5. Preference is therefore given to derivatives of vanadic acid and/or of orthovanadic acid. Vanadium compounds, especially orthovanadates, are able to carry out condensation reactions with themselves, depending on the pH of the solution, without experiencing any change in the oxidation number of the vanadium. The use of these polyvanadium anions is likewise in accordance with the invention. Additionally, orthovanadates can be obtained with very different amounts of water of crystallization without this adversely affecting their activity as catalysts. Particular preference is given to lithium vanadate Li$_3$VO$_4$, sodium vanadate Na$_3$VO$_4$, and potassium vanadate K$_3$VO$_4$, and to lithium metavanadate LiVO$_3$, sodium metavanadate NaVO$_3$, and potassium metavanadate KVO$_3$.

Apart from the abovementioned compounds the species in question can comprise complexes with alcohols, phenols, sugars, organic acids, (poly)ethers, etc. Lithium vanadate and sodium vanadate are particularly preferred.

The vanadium compounds are added in amounts of from 0.01 to 5% by weight, preferably from 0.1 to 2% by weight, with particular preference from 0.2 to 1% by weight, based on the sum of components (a), (b) and (e). The addition can be made to any of components (a), (b), (d) or (e) or to mixtures thereof, either during the preparation or subsequently, to the respective component or to the finished coating material. Preference is given to addition during the preparation either to component (a) or (b) or to mixtures thereof. In aqueous systems the vanadium compounds of the invention are added to the respective components with particular preference before the dispersing water is added. The vanadium compounds of the invention can be added as finely ground solids, as a suspension in the desired liquids or as a solution.

The one-component baking systems of the invention comprise as solvent (d) water and/or organic solvents or mixtures thereof.

As organic solvents it is possible to use all known solvents. Preference is given to the solvents used in the paints industry such as xylene, butyl acetate, ethyl acetate, butylglycol acetate, methoxypropyl acetate, hydrocarbons such as Solvesso (Exxon Chemicals) 100, N-methylpyrrolidone.

Besides the blocked polyisocyanates (a) and polyols (b) it is possible to add customary additives and other auxiliaries (e) to the formulations (examples being pigments, fillers, levelling agents, defoamers, catalysts) and, if desired, catalysts other than (c) as well.

The paints, inks and other formulations are prepared from the one-component baking systems of the invention by conventional methods. Irrespective of the preparation method chosen the one-component baking systems of the invention comprise the above-described individual components (a) to (e), the amounts of (a)+ (b) being from 20 to 89.9 parts by weight, (c) from 0.01 to 5 parts by weight, the amount of (d) from 10 to 75 parts by weight and of (e) from 0 to 10 parts by weight, with the proviso that the sum of the parts by weight of the individual components (a) to (e) is 100.

The one-component baking systems of the invention preferably comprise the above-described individual components (a) to (e) with the proviso that together they give a sum of 100 parts by weight, the amounts of (a)+(b) being from 30 to 69.9 parts by weight, (c) from 0.01 to 2 parts by weight, the amount of (d) from 30 to 70 parts by weight and (e) from 0 to 8 parts by weight.

The one-component baking systems of the invention are used to prepare baking enamels, for industrial coating, for example, and in the OEM finishing of passenger cars. These baking enamels can be, for example, primers, surfacers and topcoat materials. The baking enamels may comprise pigments or may be pure topcoat materials. For this purpose the coating compositions of the invention can be applied by knife coating, dipping, spray application such as compressed air spraying or airless spraying, and also by electrostatic application, high-speed rotating bell application for example. The dry film coat thickness can be, for example, 10–120 μm. The dry films are cured by baking in temperature ranges of 90–160° C., preferably 110–140° C., with particular preference at 120–130° C.

The substrates coated with coatings obtainable from formulations based on the one-component baking systems of the invention are likewise provided by the present invention.

The examples below illustrate the invention.

EXAMPLES

In the examples below all percentages are by weight.

Preparation of the Self-Crosslinker for Examples 1–4

Added to 789.8 g (3.71 eq NCO) of an aliphatic polyisocyanate (HDI trimer, Desmodur® N 3300, Bayer AG, D-Leverkusen) were 336.7 g of N-methyl-pyrrolidone. With stirring, 374.9 g (3.71 eq) of diisopropylamine were added over the course-of 60 minutes at a rate such that the temperature did not-exceed 70° C. Stirring was subsequently carried out at 70° C. for 60 minutes; after that time isocyanate groups were no longer detectable according to IR spectroscopy. At 70° C. 2311 g (5.29 eq hydroxyl groups) of a polyester polyacrylate formed from a polyester polyol made from 1,6-hexanediol, trimethylolpropane, peanut-oil fatty acid, maleic anhydride and phthalic anhydride, with an OH number of 136, grafted with a mixture of butyl acrylate, methyl methacrylate and hydroxypropyl methacrylate, and acrylic acid were added and the mixture was stirred for 20 minutes. Then 115.5 g (1.296 eq) of dimethylethanolamine were added, followed by stirring for 10 minutes.

The amounts of finely powdered sodium orthovanadate indicated in Table 6 were added at 70° C. to 614 g portions of this reaction mixture, followed by stirring for 30 minutes. Then in each case 581 g of deionized water at a temperature of 70° C. were added with vigorous stirring, followed by stirring for 60 minutes, after which the dispersions were allowed to cool with stirring. The dispersions obtained possessed a solids content of 45% and the further additional properties:

It is evident that through the use of the vanadium catalysts a better chemical resistance can be brought about. The pendulum hardness increases as well. The reduction in crosslinking temperature amounts to approximately 20° C.

Examples 1 to 4

| (PES/PAC/N 3300 blocked with DIPA) | No catalyst | 0.75% sodium stannate | 0.75% sodium orthovanadate | +0.75% sodium tellurite |
|---|---|---|---|---|
| An (DIN cup 4) | | | | |
| 0 value | 52s | 61s | 65s | 62s |
| after 4 wks. 40° C. | | 66 | 85s | 67s |
| PH | | | | |
| 0 value | 9.2 | 9.5 | 9.5 | 9.3 |
| after 4 wks 40° C. | | 9.3 | 9.3 | 9.1 |
| Clearcoat: binder + Additol XW 395 (1.8%) + H₂O | | | | |
| An (DIN cup 4) | | | | |
| 0 value | 32s | 39s | 38s | 38s |
| after 11 d 40° C. | 27s | 39s | 42s | 39s |
| Pendulum hardness | | | | |
| 30' 120° C. | 24s | 27s | 83s | 29s |
| 30' 130° C. | 29s | 34s | 92s | 35s |
| 30' 140° C. | 67s | 64s | 126s | 55s |
| Incipient dissolubility 1' | | | | |
| 30' 120° C. | 4444 | 4444 | 1144 | 4444 |
| 30' 130° C. | 3344 | 3344 | 0124 | 3344 |
| 30' 140° C. | 1144 | 1144 | 0014 | 1144 |
| Clearcoat testing after 11 d of storage at 40° C. | | | | |
| Pendulum hardness | | | | |
| 30' 120° C. | 29s | 31s | 69s | 32s |
| 30' 130° C. | 32s | 32s | 88s | 36s |
| 30' 140° C. | 63s | 70s | 134s | 55s |
| Incipient dissolubility 1' | | | | |
| 30' 120° C. | 4444 | 4444 | 1144 | 3344 |
| 30' 130° C. | 3344 | 3344 | 1144 | 3344 |
| 30' 140° C. | 1144 | 1144 | 0014 | 1144 |

The comparative example demonstrates the distinct increase in pendulum hardness and in the solvent resistance of the coating system following curing as a result of the catalysis by vanadate compounds.

Examples 5 to 11

| Catalyst | No catalyst | 0.4% sodium metavanadate (in dispersion) | 0.4% sodium metavanadate (in melt) | 0.4% vanadium(IV) sulphate oxide VOSO₄ | 0.4% sodium orthovanadate (in melt) | 0.4% lithium orthovanadate (in melt) |
|---|---|---|---|---|---|---|
| Coating system: Desmodur® VP LS 2253 + PES/PAC-polyol An (DIN cup 4) | | | | | | |
| 0 value | 143s | 235s | 189s | 200s | 270s | 285s |
| pH | | | | | | |
| 0 value | 8.1 | 8.6 | 8.6 | 8.3 | 9.0 | 8.9 |
| Clearcoat: binder + Additol® XW 395 (1.8%) + H₂O An (DIN cup 4) | | | | | | |
| 0 value | 36s | 36s | 36s | 38s | 38s | 37s |
| after 7 d 40° C. | 20s | 21s | 21s | 22s | 27s | 28s |
| Pendulum hardness immediate/-after | | | | | | |
| 7d 40° C. | | | | | | |
| 30' 80° C. | | sticks | sticks | sticks | sticks | sticks |
| 30' 90° C. | sticks | 14s/n.m. | 13s/n.m. | 6s/n.m. | 8s/n.m. | 10s/n.m. |
| 30' 100° C. | 8s/8s | 45s/45s | 46s/43s | 20s/27s | 36s/36s | 39s/57s |
| 30' 110° C. | 11s/11s | 76s/63s | 78s/77s | 36s/53s | 53s/87s | 78s/73s |
| 30' 120° C. | 39s/34s | 129s/132s | 136s/141s | 106s/105s | 127s/146s | 143s/139s |
| 30' 130° C. | 43s/55s | 153s/151s | 148s/148s | 144s/129s | 146s/150s | 160s/147s |
| Incipient dissolubility 1' immediate/after | | | | | | |
| 7d 40° C. | | | | | | |
| 30' 80° C. | — | — | — | — | — | — |
| 30' 90° C. | — | 5555/— | 5555/— | 5555/— | 5555/— | 5555/— |
| 30' 100° C. | 5555/5555 | 4444/4344 | 4444/4344 | 5555/4455 | 4455/4355 | 4445/4444 |
| 30' 110° C. | 5555/5555 | 2244/3244 | 2144/3244 | 4355/4355 | 2244/4355 | 2244/3144 |
| 30' 120° C. | 4344/4344 | 0044/0044 | 0044/0044 | 1144/1144 | 0044/0144 | 0044/0144 |
| 30' 130° C. | 4344/4244 | 0014/0044 | 0024/0044 | 0044/0144 | 0014/0044 | 0014/0124 |

The blocked polyisocyanate used is a hexamethylene diisocyanate trimer blocked with 3,5-dimethylpyrazole (Desmodur® VP LS 2253, Bayer AG). The polyol used was a polyester polyacrylate formed from a polyester polyol made from 1,6-hexanediol, trimethylolpropane, peanut oil fatty acid, maleic anhydride and phthalic anhydride with an OH number of 136, grafted with a mixture of butyl acrylate, methyl methacrylate and hydroxypropyl methacrylate, and acrylic acid.

Examples 12 to 14

| Catalyst: | No catalyst | 0.4% Sodium meta-vanadate (in dispersion) | 0.4% Sodium meta-vanadate (in melt) |
|---|---|---|---|
| Coating system: Desmodur® VP LS 2253//Z 4470//LS 2056 (Ureth. mod. polyester-polyol) | | | |
| pH | | | |
| 0 value | 7.9 | 8.0 | 8.0 |
| Clearcoat: Additol® XW 395 (1.8%) + H₂O An (DIN cup 4) | | | |
| 0 value | 35s | 36s | 34s |
| after 7 d 40° C. | 20s | 19s | 17s |
| Pendulum hardness immediate/after 7 d 40° C. | | | |
| 30' 80° C. | sticks | 29s/n.m. | 35s/n.m. |
| 30' 100° C. | 57s/62s | 88s/113s | 91s/113s |
| 30' 110° C. | 64s/81s | 116s/134s | 133s/146s |
| 30' 120° C. | 109s/106s | 151s/167s | 167s/174s |
| 30' 130° C. | 130s/133s | 153s/165s | 164s/172s |
| Incipient dissolubility 1' immediate/after 7d 40° C. | | | |
| 30' 80° C. | — | 5555/— | 5555/— |
| 30' 90° C. | — | 5555/— | 5555/— |
| 30' 100° C. | 5555/5555 | 5555/5555 | 5555/5555 |
| 30' 110° C. | 5555/5555 | 3455/3455 | 3355/3455 |
| 30' 120° C. | 5555/5555 | 1244/1244 | 2244/2244 |
| 30' 130° C. | 3455/5455 | 1244/1244 | 1244/1144 |

The blocked polyisocyanate used is a hexamethylene diisocyanate trimer blocked with 3,5-dimethylpyrazole (Desmodur® VPS 2253, Bayer AG) admixed proportionately with isophorone diisocyanate (IPDI) Z4470, Bayer AG, Leverkusen) by prior reaction with the PES-PUR polyol described below. The polyol used in this case is a so-called PES-PUR polyol (Bayhydrol VP LS 2056, Bayer AG, Leverkusen, OH content 1.7% by weight), consisting of neopentyl glycol, propylene glycol, trimethylolpropane, adipic acid, isophthalic acid, dimethylolpropionic acid, hexamethylene diisocyanate, N-methylpyrrolidone, dimethylethanolamine, and water. The solids content is 47%.

In the case of Examples 6 to 15 it is found that the baking temperatures of the aqueous 1K systems can be reduced by approximately 20° C. in the presence of the vanadium catalysts.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Aqueous, one-component baking systems comprising a blocked polyisocyanate, a polymer having isocyanate-reactive groups, water and one or more organic and/or inorganic compounds of vanadium in which the vanadium has an oxidation state of at least +4.

2. The systems according to claim 1, wherein the vanadium compounds comprise a member selected from the group consisting of ammonium, lithium, sodium and potassium vanadate, lithium, sodium and potassium orthovanadate, magnesium vanadate, calcium vanadate, vanadyl(IV) acetylacetonate $(VO(C_5H_7O_5)_2)$, vanadyl bistetramethylheptadionate $VO(TMHD)_2$ and vanadic acid.

3. The systems according to claim 1, wherein the vanadium compounds comprise a member selected from the group consisting of lithium vanadate $Li_3VO_4$, sodium vanadate $Na_3VO_4$, potassium vanadate $K_3VO_4$, lithium metavanadate $LiVO_3$, sodium metavanadate $NaVO_3$ and potassium metavanadate $KVO_3$.

4. The systems according to claim 1, wherein the vanadium compounds comprise lithium or sodium vanadate.

5. The systems according to claim 1 wherein the systems comprise
    (a) one or more blocked polyisocyanates,
    (b) one or more polymers having polyisocyanate-reactive groups,
    (c) one or more organic and/or inorganic compounds of vanadium in which the vanadium has an oxidation state of at least +4,
    (d) water and optionally one or more organic solvents or solvent mixtures and
    (e) optionally further additives and auxiliaries,
the amounts of (a)+(b) being from 20 to 89.9 parts by weight, (c) from 0.01 to 5 parts by weight, (d) from 10 to 70 parts by weight and (e) from 0 to 10 parts by weight and the sum of the parts by weight of components (a) to (e) being 100, based on the weight of components (a) to (e).

6. The systems according to claim 5, wherein blocked polyisocyanates (a) comprise one or more aliphatic isocyanates.

7. The systems according to claim 5, wherein blocked polyisocyanates (a) comprise one or more aromatic isocyanates.

8. The systems according to claim 5, wherein blocked polyisocyanates (a) comprise hexamethylene diisocyanate, isophorone diisocyanate, 4,4'-diisocyanatodicyclohexylmethane, their derivatives and/or mixtures.

9. The systems according to claim 5, wherein the polyisocyanates (a) are hydrophilic.

10. The systems according to claim 5, wherein component (c) comprises one or more salts of vanadic acid or condensation products thereof.

11. The systems according to claim 5, wherein component (c) comprises lithium, sodium or potassium ortho- or metavanadate.

12. A process for preparing the systems according to claim 5, comprising introducing component (c) into components (a) and/or (b) prior to the dispersing or dissolution thereof in component (d).

13. A process for preparing the systems according to claim 5, comprising introducing component (c) into component (d) prior to the dispersing or dissolution of component (a) and/or (b) in the same.

14. A process for preparing an aqueous or water-dispersible system according to claim 5, comprising adding component (c) to one or more of components (a), (b), (d) and/or (e) before adding a dispersing quantity of water.

15. A method for preparing paints, inks and adhesives comprising adding one or more additives selected from the group consisting of pigments, fillers, levelling agents, defoamers, and catalysts other than (c) to the systems according to claim 5.

16. The systems according to claim 2 wherein the systems comprise
    (a) one or more blocked polyisocyanates,
    (b) one or more polymers having polyisocyanate-reactive groups,
    (c) one or more organic and/or inorganic compounds of vanadium in which the vanadium has an oxidation state of at least +4,
    (d) water and optionally one or more organic solvents or solvent mixtures and
    (e) optionally further additives and auxiliaries,
the amounts of (a)+(b) being from 20 to 89.9 parts by weight, (c) from 0.01 to 5 parts by weight, (d) from 10 to 70 parts by weight and (e) from 0 to 10 parts by weight and the sum of the parts by weight of components (a) to (e) being 100, based on the weight of components (a) to (e).

17. The systems according to claim 3 wherein the systems comprise
    (a) one or more blocked polyisocyanates,
    (b) one or more polymers having polyisocyanate-reactive groups,
    (c) one or more organic and/or inorganic compounds of vanadium in which the vanadium has an oxidation state of feast +4,
    (d) water and optionally one or more organic solvents or solvent mixtures and
    (e) optionally further additives and auxiliaries,
the amounts of (a)+(b) being from 20 to 89.9 parts by weight, (c) from 0.01 to 5 parts by weight, (d) from 10 to 70 parts by weight and (e) from 0 to 10 parts by weight and the sum of the parts by weight of components (a) to (e) being 100, based on the weight of components (a) to (e).

18. The systems according to claim 4 wherein the systems comprise
    (a) one or more blocked polyisocyanates,
    (b) one or more polymers having polyisocyanate-reactive groups,
    (c) one or more organic and/or inorganic compounds of vanadium in which the vanadium has an oxidation state of at least +4,
    (d) water and optionally one or more organic solvents or solvent mixtures and
    (e) optionally further additives and auxiliaries,
the amounts of (a)+(b) being from 20 to 89.9 parts by weight, (c) from 0.01 to 5 parts by weight, (d) from 10 to 70 parts by weight and (e) from 0 to 10 parts by weight and the sum of the parts by weight of components (a) to (e) being 100, based on the weight of components (a) to (e).

* * * * *